US009625905B2

(12) United States Patent
Rosenberg

(10) Patent No.: US 9,625,905 B2
(45) Date of Patent: Apr. 18, 2017

(54) HAPTIC REMOTE CONTROL FOR TOYS

(75) Inventor: Louis B. Rosenberg, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 319 days.

(21) Appl. No.: 09/823,943

(22) Filed: Mar. 30, 2001

(65) Prior Publication Data
US 2002/0142701 A1    Oct. 3, 2002

(51) Int. Cl.
*A63H 30/04*    (2006.01)
*G05D 1/00*    (2006.01)

(52) U.S. Cl.
CPC .............. *G05D 1/005* (2013.01); *A63H 30/04* (2013.01); *G05D 2201/0214* (2013.01)

(58) Field of Classification Search
CPC ......... G06F 3/016; G06F 3/0346; A63H 3/28; A63H 18/007; A63H 30/04; A63F 13/02; A63F 13/06; A63F 13/10
USPC ........ 463/36, 37, 38, 39; 446/454, 456, 175, 446/3; 345/156, 161, 163, 167
See application file for complete search history.

(56) References Cited

U.S. PATENT DOCUMENTS

| | | |
|---|---|---|
| 3,157,853 A | 11/1964 | Hirsch |
| 3,220,121 A | 11/1965 | Cutler |
| 3,497,668 A | 2/1970 | Hirsch |
| 3,517,446 A | 6/1970 | Corlyon et al. |
| 3,902,687 A | 9/1975 | Hightower |
| 3,903,614 A | 9/1975 | Diamond et al. |
| 3,919,691 A | 11/1975 | Noll |
| 4,160,508 A | 7/1979 | Salisbury, Jr. |
| 4,236,325 A | 12/1980 | Hall et al. |

(Continued)

FOREIGN PATENT DOCUMENTS

| | | |
|---|---|---|
| EP | 0265011 | 4/1988 |
| EP | 0 085 518 B1 | 8/1989 |

(Continued)

OTHER PUBLICATIONS

Webster's Third New International Dictionary of the English Language Unabridged, 1965, pp. 1375-1376.*

(Continued)

*Primary Examiner* — Aarti B Berdichevsky
*Assistant Examiner* — Urszula M Cegielnik
(74) *Attorney, Agent, or Firm* — Kilpatrick Townsend & Stockton LLP

(57) ABSTRACT

A haptic feedback remote control device provides control signals to a toy device, such as a car, boat, plane, etc., to control the toy's operation. The remote control device includes a housing and at least one control for manual manipulation by the user, where control signals representing the manipulation are sent to the toy, preferably transmitted wirelessly. An actuator outputs forces on the housing and/or on a control in response to actuator signals. A controller provides the actuator signals based on the manual manipulation of the control by the user, or based on status signals from the toy indicating the toy's actions or interactions, or based on both. In one embodiment, the actuator moves an inertial mass to provide inertial sensations on the housing. The information received from the toy device can include information from a contact sensor or inertial sensor on the toy device.

20 Claims, 6 Drawing Sheets

(56) References Cited

U.S. PATENT DOCUMENTS

| | | | |
|---|---|---|---|
| 4,414,984 A | 11/1983 | Zarudiansky | |
| 4,513,235 A | 4/1985 | Acklam et al. | |
| 4,581,491 A | 4/1986 | Boothroyd | |
| 4,599,070 A | 7/1986 | Hladky et al. | |
| 4,695,266 A * | 9/1987 | Hui | 446/454 |
| 4,706,294 A | 11/1987 | Ouchida | |
| 4,708,656 A | 11/1987 | De Vries et al. | |
| 4,713,007 A | 12/1987 | Alban | |
| 4,731,603 A | 3/1988 | McRae et al. | |
| 4,795,296 A | 1/1989 | Jau | |
| 4,868,549 A | 9/1989 | Affinito et al. | |
| 4,885,565 A | 12/1989 | Embach | |
| 4,891,764 A | 1/1990 | McIntosh | |
| 4,930,770 A | 6/1990 | Baker | |
| 4,934,694 A | 6/1990 | McIntosh | |
| 4,938,483 A * | 7/1990 | Yavetz | 463/5 |
| 4,940,234 A * | 7/1990 | Ishida et al. | 273/442 |
| 4,964,837 A * | 10/1990 | Collier | 446/409 |
| 5,019,761 A | 5/1991 | Kraft | |
| 5,022,407 A | 6/1991 | Horch et al. | |
| 5,024,626 A * | 6/1991 | Robbins et al. | 446/454 |
| 5,035,242 A | 7/1991 | Franklin | |
| 5,038,089 A | 8/1991 | Szakaly | |
| 5,078,152 A | 1/1992 | Bond | |
| 5,103,404 A | 4/1992 | McIntosh | |
| 5,107,262 A | 4/1992 | Cadoz et al. | |
| 5,146,566 A | 9/1992 | Hollis, Jr. et al. | |
| 5,184,319 A | 2/1993 | Kramer | |
| 5,186,629 A | 2/1993 | Rohen | |
| 5,186,695 A | 2/1993 | Mangseth et al. | |
| 5,195,920 A * | 3/1993 | Collier | 446/175 |
| 5,203,563 A | 4/1993 | Loper, III | |
| 5,212,473 A | 5/1993 | Louis | |
| 5,216,337 A * | 6/1993 | Orton et al. | 446/456 |
| 5,240,417 A | 8/1993 | Smithson et al. | |
| 5,271,290 A | 12/1993 | Fischer | |
| 5,275,174 A | 1/1994 | Cook | |
| 5,296,871 A | 3/1994 | Paley | |
| 5,299,810 A | 4/1994 | Pierce | |
| 5,309,140 A | 5/1994 | Everett | |
| 5,334,027 A | 8/1994 | Wherlock | |
| 5,354,162 A | 10/1994 | Burdea et al. | |
| 5,388,992 A | 2/1995 | Franklin et al. | |
| 5,389,865 A | 2/1995 | Jacobus et al. | |
| 5,399,091 A | 3/1995 | Mitsumoto | |
| 5,405,152 A | 4/1995 | Katanics et al. | |
| 5,440,183 A | 8/1995 | Denne | |
| 5,459,382 A | 10/1995 | Jacobus et al. | |
| 5,466,213 A | 11/1995 | Hogan | |
| 5,547,382 A | 8/1996 | Yamasaki | |
| 5,565,840 A | 10/1996 | Thorner et al. | |
| 5,580,251 A | 12/1996 | Gilkes et al. | |
| 5,583,478 A | 12/1996 | Renzi | |
| 5,587,937 A | 12/1996 | Massie et al. | |
| 5,589,828 A | 12/1996 | Armstrong | |
| 5,619,180 A | 4/1997 | Massimino et al. | |
| 5,631,861 A | 5/1997 | Kramer | |
| 5,643,087 A | 7/1997 | Marcus et al. | |
| 5,661,446 A | 8/1997 | Anderson et al. | |
| 5,669,818 A | 9/1997 | Thorner et al. | |
| 5,684,722 A | 11/1997 | Thorner et al. | |
| 5,692,956 A * | 12/1997 | Rifkin | 463/37 |
| 5,709,219 A | 1/1998 | Chen et al. | |
| 5,714,978 A | 2/1998 | Yamanaka et al. | |
| 5,721,566 A * | 2/1998 | Rosenberg et al. | 345/156 |
| 5,734,373 A | 3/1998 | Rosenberg et al. | |
| 5,736,978 A | 4/1998 | Hasser et al. | |
| 5,739,811 A | 4/1998 | Rosenberg et al. | |
| 5,742,278 A | 4/1998 | Chen et al. | |
| 5,754,023 A | 5/1998 | Roston et al. | |
| 5,766,016 A | 6/1998 | Sinclair | |
| 5,781,172 A | 7/1998 | Engel et al. | |
| 5,784,052 A | 7/1998 | Keyson | |
| 5,785,630 A | 7/1998 | Bobick et al. | |
| 5,790,108 A | 8/1998 | Salcudean et al. | |
| 5,805,140 A | 9/1998 | Rosenberg et al. | |
| 5,857,986 A | 1/1999 | Moriyasu | |
| 5,889,672 A | 3/1999 | Schuler et al. | |
| 5,894,263 A | 4/1999 | Shimakawa et al. | |
| 5,897,437 A | 4/1999 | Nishiumi et al. | |
| 5,914,705 A | 6/1999 | Johnson et al. | |
| 5,945,772 A | 8/1999 | Macnak et al. | |
| 5,973,670 A | 10/1999 | Barber et al. | |
| 5,984,880 A | 11/1999 | Lander et al. | |
| 5,986,643 A | 11/1999 | Harvill et al. | |
| 6,001,014 A * | 12/1999 | Ogata et al. | 463/37 |
| 6,004,134 A | 12/1999 | Marcus et al. | |
| 6,036,495 A * | 3/2000 | Marcus et al. | 463/38 |
| 6,044,646 A | 4/2000 | Silverbrook | |
| 6,078,126 A | 6/2000 | Rollins et al. | |
| 6,088,017 A | 7/2000 | Tremblay et al. | |
| 6,088,019 A | 7/2000 | Rosenberg | |
| 6,104,158 A | 8/2000 | Jacobus et al. | |
| 6,111,577 A | 8/2000 | Zilles et al. | |
| 6,113,459 A * | 9/2000 | Nammoto | 446/454 |
| 6,121,955 A * | 9/2000 | Liu | 345/161 |
| 6,154,201 A * | 11/2000 | Levin et al. | 345/156 |
| 6,160,540 A * | 12/2000 | Fishkin et al. | 463/30 |
| 6,169,540 B1 * | 1/2001 | Rosenberg | G05G 9/047 345/157 |
| 6,184,868 B1 * | 2/2001 | Shahoian et al. | 345/156 |
| 6,198,206 B1 | 3/2001 | Saarmaa et al. | |
| 6,211,861 B1 | 4/2001 | Rosenberg et al. | |
| 6,241,574 B1 * | 6/2001 | Helbing | 446/456 |
| 6,256,011 B1 * | 7/2001 | Culver | 345/156 |
| 6,268,857 B1 * | 7/2001 | Fishkin | G06F 1/16 345/156 |
| 6,275,213 B1 | 8/2001 | Tremblay et al. | |
| 6,280,327 B1 * | 8/2001 | Leifer et al. | 463/39 |
| RE37,374 E | 9/2001 | Roston et al. | |
| 6,293,798 B1 * | 9/2001 | Boyle et al. | 434/29 |
| 6,317,032 B1 | 11/2001 | Oishi | |
| 6,346,025 B1 * | 2/2002 | Tachau et al. | 446/71 |
| 6,422,941 B1 | 7/2002 | Thorner et al. | |
| 6,424,333 B1 | 7/2002 | Tremblay et al. | |
| 6,585,595 B1 | 7/2003 | Soma et al. | |
| 6,641,480 B2 * | 11/2003 | Murzanski et al. | 463/38 |
| 6,650,318 B1 * | 11/2003 | Arnon | 345/156 |
| 6,686,901 B2 * | 2/2004 | Rosenberg | 345/156 |
| 6,697,043 B1 | 2/2004 | Shahoian et al. | |
| 6,707,443 B2 | 3/2004 | Bruneau et al. | |
| 6,717,573 B1 | 4/2004 | Shahoian et al. | |
| 6,807,291 B1 * | 10/2004 | Tumey et al. | 446/484 |
| 2001/0003101 A1 * | 6/2001 | Shinohara et al. | 463/46 |
| 2001/0045978 A1 * | 11/2001 | McConnell et al. | 348/42 |
| 2002/0030663 A1 | 3/2002 | Tierling et al. | |
| 2002/0103025 A1 * | 8/2002 | Murzanski et al. | 463/37 |
| 2003/0030619 A1 * | 2/2003 | Martin et al. | 345/156 |
| 2003/0201975 A1 | 10/2003 | Bailey et al. | |

FOREIGN PATENT DOCUMENTS

| | | | |
|---|---|---|---|
| EP | 0607580 A1 | 7/1994 | |
| EP | 0626634 A2 | 11/1994 | |
| EP | 0 695 566 | 2/1996 | |
| EP | 0 940 162 A1 | 9/1999 | |
| EP | 977142 | * 2/2000 | |
| GB | 2237160 A | * 4/1991 | |
| GB | 2 336 890 | 11/1999 | |
| JP | 0349086 | 1/1990 | |
| JP | 01-003664 | 7/1990 | |
| JP | 3033148 | 2/1991 | |
| JP | 02-109714 | 1/1992 | |
| JP | 04-007371 | 8/1993 | |
| JP | 05-300985 | 11/1993 | |
| JP | 06-039097 | 5/1994 | |
| JP | 05-193862 | 1/1995 | |
| JP | 07-024708 B | 3/1995 | |
| JP | 07-019512 Y2 | 5/1995 | |
| JP | 07-053189 | 6/1995 | |
| JP | 08-048297 | 2/1996 | |
| JP | 08-168545 | 7/1996 | |
| JP | 9-215870 | 8/1997 | |
| JP | 10-314463 | 12/1998 | |

(56) References Cited

FOREIGN PATENT DOCUMENTS

| | | |
|---|---|---|
| JP | 11-004966 | 1/1999 |
| JP | 11-313001 | 11/1999 |
| JP | 2000-020222 | 1/2000 |
| JP | 2000-102677 | 4/2000 |
| JP | 2000-317866 | 11/2000 |
| JP | 2000-334163 | 12/2000 |
| JP | 2001-502200 | 2/2001 |
| JP | 2001-062160 | 3/2001 |
| WO | WO92/00559 | 1/1992 |
| WO | WO97/31333 | 8/1997 |
| WO | WO98/32112 | 7/1998 |
| WO | WO99/40504 | 8/1999 |
| WO | WO01/03105 | 1/2001 |
| WO | WO01/13354 | 2/2001 |
| WO | WO01/24158 | 4/2001 |
| WO | WO02/27705 | 4/2002 |

OTHER PUBLICATIONS

Internet: Islwww.epfl.ch/~penha/predoc/vr/haptic.html, "Haptics", (printed from www.archive.org), 1999.*
An Architecture for Haptic Control of Media, 1999 Internation Mechanical Engineering Congress and Exposition—Eighth Annua Symposium on Haptic Interfaces for Virtual Environments and Teleoperator Systems, 1999.*
Web page Conti, "HapticDriver Remote Driving with Force Feedback," at URL=http://robotics.stanford.edu/~conti/HapticDriver, pp. 4.
Web page Fong et al., Novel interfaces for remote driving: gesture, haptic and PDA, at URL=http://imtsg7.epfl.ch/papers/SPIE00-TF.pdf, pp. 12.
Korean Intellectual Property Office, Korean Application No. 10-2003-7012826, Notice of Preliminary Rejection, mailed Jan. 4, 2008, 12 pages.
Japan Patent Office, Japanese Application No. 2002-577071, Notice for Reasons of Rejection, mailed Jul. 19, 2007, 6 pages.
Patent Office of the Peoples Republic of China, Chinese Application No. 02807519, First Office Action, mailed Aug. 18, 2006, 3 pages.
Patent Office of the Peoples Republic of China, Chinese Application No. 02807519, Second Office Action, mailed Mar. 14, 2008, 3 pages.
European Patent Office, Application No. 02726696, Communication, mailed Feb. 22, 2006, 3 pages.
Patent Cooperation Treaty, International Search Report, International Application No. PCT/US02/10394, 2 pages.
Baigrie, "Electric Control Loading—A Low Cost, High Performance Alternative," Proceedings, pp. 247-254, Nov. 6-8, 1990.
Iwata, "Pen-based Haptic Virtual Environment," 0-7803-1363-1/93 IEEE, pp. 287-292, 1993.
Russo, "The Design and Implementation of a Three Degree of Freedom Force Output Joystick," MIT Libraries Archives Aug. 14, 1990, pp. 1-131, May 1990.
Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.
Jones et al., "A perceptual analysis of stiffness," ISSN 0014-4819 Springer International (Springer-Verlag); Experimental Brain Research, vol. 79, No. 1, pp. 150-156, 1990.
Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.
Snow et al.,"Model-X Force-Reflecting-Hand-Controller," NT Control No. MPO-17851; JPL Case No. 5348, pp. 1-4, Jun. 15, 1989.
Ouh-Young, "Force Display in Molecular Docking," Order No. 9034744, p. 1-369, 1990.
Tadros, "Control System Design for a Three Degree of Freedom Virtual Environment Simulator Using Motor/Brake Pair Actuators", MIT Archive © Massachusetts Institute of Technology, pp. 1-88, Feb. 1990.

Caldwell et al., "Enhanced Tactile Feedback (Tele-Taction) Using a Multi-Functional Sensory System," 1050-4729/93, pp. 955-960, 1993.
Adelstein, "Design and Implementation of a Force Reflecting Manipulandum for Manual Control research," DSC-vol. 42, Advances in Robotics, Edited by H. Kazerooni, pp. 1-12, 1992.
Gotow et al., "Controlled Impedance Test Apparatus for Studying Human Interpretation of Kinesthetic Feedback," WA11-11:00, pp. 332-337.
Stanley et al., "Computer Simulation of Interacting Dynamic Mechanical Systems Using Distributed Memory Parallel Processors," DSC-vol. 42, Advances in Robotics, pp. 55-61, ASME 1992.
Russo, "Controlling Dissipative Magnetic Particle Brakes in Force Reflective Devices," DSC-vol. 42, Advances in Robotics, pp. 63-70, ASME 1992.
Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.
Patrick et al., "Design and Testing of a Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.
Adelstein, "A Virtual Environment System for The Study of Human Arm Tremor," Ph.D. Dissertation, Dept. of Mechanical Engineering, MIT, Jun. 1989.
Bejczy, "Sensors, Controls, and Man-Machine Interface for Advanced Teleoperation," Science, vol. 208, No. 4450, pp. 1327-1335, 1980.
Bejczy, "Generalization of Bilateral Force-Reflecting Control of Manipulators," Proceedings of Fourth CISM-IFToMM, Sep. 8-12, 1981.
McAffee, "Teleoperator Subsystem/Telerobot Demonsdtrator: Force Reflecting Hand Controller Equipment Manual," JPL D-5172, pp. 1- 50, A1-A36, B1-65, C1-C36, Jan. 1988.
Minsky, "Computational Haptics: The Sandpaper System for Synthesizing Texture for a Force-Feedback Display," Ph.D. Dissertation, MIT, Jun. 1995.
Jacobsen et al., "High Performance, Dextrous Telerobotic Manipulator With Force Reflection," Intervention/ROV '91 Conference & Exposition; Hollywood, Florida, May 21-23, 1991.
Shimoga, "Finger Force and Touch Feedback Issues in Dexterous Telemanipulation," Proceedings of Fourth Annual Conference on Intelligent Robotic Systems for Space Expploration, Rensselaer Polytechnic Institute, Sep. 30-Oct. 1, 1992.
IBM Technical Disclosure Bullein, "Mouse Ball-Actuating Device With Force and Tactile Feedback," vol. 32, No. 9B, Feb. 1990.
Terry et at., "Tactile Feedback in a Computer Mouse," Proceedings of Fouteenth Annual Northeast Bioengineenng Conference, University of New Hampshire, Mar. 10-11, 1988.
Howe, "A Force-Reflecting Teleoperated Hand System for the Study of Tactile Sensing in Precision Manipulation," Proceedings of the 1992 IEEE International Conference on Robotics and Automation, Nice, France, May 1992.
Eberhardt et al., "OMAR—A Haptic display for speech perception by deaf and deaf-blind individuals," IEEE Virtual Reality Annual International Symposium, Seattle, WA, Sep. 18-22, 1993.
Rabinowitz et al., "Multidimensional tactile displays: Identification of vibratory intensity, frequency, and contactor area," Journal of The Acoustical Society of America, vol. 82, No. 4, Oct. 1987.
Bejczy et al., "Kinesthetic Coupling Between Operator and Remote Manipulator," International Computer Technology Conference, The American Society of Mechanical Engineers, San Francisco, CA, Aug. 12-15, 1980.
Bejczy et al., "A Laboratory Breadboard System for Dual-Arm Teleoperation," SOAR '89 Workshop, JSC, Houston, TX, Jul. 25-27, 1989.
Ouh-Young, "A Low-Cost Force Feedback Joystick and Its Use in PC Video Games," IEEE Transactions on Consumer Electronics, vol. 41, No. 3, Aug. 1995.
Marcus, "Touch Feedback in Surgery," Proceedings of Virtual Reality and Medicine The Cutting Edge, Sep. 8-11, 1994.

(56) References Cited

OTHER PUBLICATIONS

Bejczy, et al., "Universal Computer Control System (UCCS) for Space Telerobots," CH2413-3/87/0000/0318501.00 1987 IEEE, 1987.

Aukstakalnis et al., "Silicon Mirage: The Art and Science of Virtual Reality," ISBN 0-938151-82-7, pp. 129-180, 1992.

Eberhardt et al., "Including Dynamic Haptic Perception by The Hand: System Description and Some Results," DSC-vol. 55-1, Dynamic Systems and Control: vol. 1, ASME 1994.

Gobel et al., "Tactile Feedback Applied to Computer Mice," International Journal of Human-Computer Interaction, vol. 7, No. 1, pp. 1-24, 1995.

Pimentel et al., "Virtual Reality: through the new looking glass," $2^{nd}$ Edition; McGraw-Hill, ISBN 0-07-050167-X, pp. 41-202, 1994.

"Cyberman Technical Specification," Logitech Cyberman SWIFT Supplement, Apr. 5, 1994.

Ouhyoung et al., "The Development of a Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Kaczmarek et al., "Tactile Displays," Virtual Environment Technologies.

Scannell, "Taking a Joystick Ride," Computer Currents, Boston Edition, vol. 9, No. 11, Nov. 1994.

Schmult, Brian et al., "Application Areas for a Force-Feedback Joystick," ASME 1993, DSC-vol. 49, pp. 47-54.

Hasser, Christopher John, "Tactile Feedback for a Force-Reflecting Haptic Display," The School of Engineering, University of Dayton, Dec. 1995, pp. iii-xii &1-96.

Akamatsu, M. et al., "Multimodal Mouse: A Mouse-Type Device with Tactile and Force Display," Presence, vol. 3, No. 1, 1994, pp. 73-80.

Kelley, A. J. et al., "MagicMouse: Tactile and Kinesthetic Feedback in the Human-Computer Interface using an Electromagnetically Actuated Input/Output Device," Dept. of Elec. Eng., Univ. of Brit. Columbia, 1993, pp. 1-27.

Hasser, C. et al., "Tactile Feedback with Adaptive Controller for a Force-Reflecting Haptic Display," Parts 1&2, IEEE 0-7803-3131-1, 1996, pp. 526-533.

Ramstein, C., "Combining Haptic and Braille Technologies: Design Issues and Pilot Study," Assets '96, $2^{nd}$ Annual ACM Conf. on Assistive Technologies, 1996, pp. 37-44.

Dennerlein, et al., "Vibrotactile Feedback for Industrial Telemanipulators," ASME IMECE, $6^{th}$ Annual Symp. on Haptic Interfaces for Virtual Environment and Teleoperator Systems, Nov. 1997, pp. 1-7.

Minsky, Margaret et al., "Feeling and Seeing: Issues in Force Display," ACM 089791-351-5, 1990, pp. 235-242.

Ouh-young, M. et al., "Creating an Illusion of Feel: Control Issues in Force Display," Computer Science Dept., University of North Carolina, 1989, pp. 1-14.

Hasser, C., "Force-Reflecting Anthropomorphic Hand Masters," AL/CF-TR-1995-0110, 1995, pp. 5-31.

Kim, Won, "Telemanipulator Technology and Space Telerobotics," SPIE Proceedings 1993, vol. 2057, pp. 40-50.

Japan Patent Office, Japanese Application No. 2002-577071, Notice for Reasons of Rejection, mailed Apr. 10, 2008.

* cited by examiner

HAPTIC REMOTE CONTROL FOR TOYS

BACKGROUND OF THE INVENTION

The present invention relates generally to the interfacing with remote devices by a user, and more particularly to devices used to interface with remote control toys and which provide haptic feedback to the user.

Humans interface with electronic and mechanical devices in a variety of applications, and the need for a more natural, easy-to-use, and informative interface is a constant concern. In the context of the present invention, one such application is the remote control of moving devices such as toy vehicles. For example, remote control toy cars are common, which are small cars that move under their own power, e.g. using batteries or gasoline. The user may typically control the direction of turning, the braking, and/or the forward/back direction of the car by using a remote control unit, which typically sends signals to the car via wireless transmission. Some remote control toys with limited motion may include a wire connecting the remote control unit with the controlled toy or device to allow the signals to be transmitted to the toy. The remote control unit may include joysticks, dials, switches, buttons, or other controls to assist the user in the control of the toy. Other types of moving toys and devices can be similarly controlled, such as flying toys (e.g., planes, helicopters, rockets), water toys (e.g., boats and submarines), trucks, robots, toy animals, etc.

One type of functionality missing from toy remote control devices is kinesthetic force feedback and/or tactile feedback, collectively known herein as "haptic feedback." Haptic feedback can be added to such interface control devices to provide the user with a more interactive experience and to provide greater ease in interfacing and controlling the remote toy device.

SUMMARY OF THE INVENTION

The present invention provides a haptic feedback remote control device for controlling moving toy devices such as cars, boats, etc. The remote control unit provides haptic feedback to the user that provides a more compelling experience when controlling the toy.

More particularly, a haptic feedback remote control device provides control signals to a toy device, such as a car, boat, plane, etc., to control the operation of the toy device. The remote control device includes a housing and at least one control for manual manipulation by the user, where control signals representing the manipulation are sent to the toy device to control the operation of the toy device. An actuator outputs forces on the housing in response to received actuator signals, and a controller provides the actuator signals to the actuator and monitors the control signals representing the manipulation of the control. The controller can determine the forces based only on the manual manipulation of the control by the user, or based partially on the manipulation. In one embodiment, the actuator moves an inertial mass to provide inertial haptic sensations on the housing, the inertial haptic sensations being felt by the user. The control includes a lever movable along an axis, a steering wheel or knob, or other control. Preferably, the control signals sent to the toy device are transmitted wirelessly to the toy device. For example, the control can be a throttle control or steering control.

An additional feature in some embodiments allows the controller to determines the forces based only or partially on information received from the toy device. For example, the information received from the toy device can includes information from a contact sensor on the toy device that indicates whether the toy device has contacted another object at a location of the contact sensor. The information can indicate a degree of contact of the toy device with the other object. In another embodiment, the information can indicate an amount of acceleration experienced by the toy device in at least one dimension of the toy device.

In another embodiment, an actuator in the remote control unit can output forces on the control manipulated by the user in response to the received electrical signals. The forces can be determined based only or partially on the local manipulation of the control(s), or partially or wholly on information indicating the status of the controlled toy. An embodiment of a remote control toy device includes a remote control unit as described above and a toy device operable to physically move in accordance with the control signals. Another embodiment is a method for controlling a toy device based on manipulation of a remote control unit by a user provide haptic sensations to the user.

The present invention provides a haptic feedback remote control device that provides haptic sensations to the user when controlling a toy vehicle or other toy device. This allows the user to experience another dimension in sensory feedback when controlling a toy remotely. The sensations can simulate what the toy is currently experiencing and can also inform the user of the status of the toy, thereby enhancing the user's control over the toy.

These and other advantages of the present invention will become apparent to those skilled in the art upon a reading of the following specification of the invention and a study of the several figures of the drawing.

DETAILED DESCRIPTION OF PREFERRED EMBODIMENTS

Figure 1:
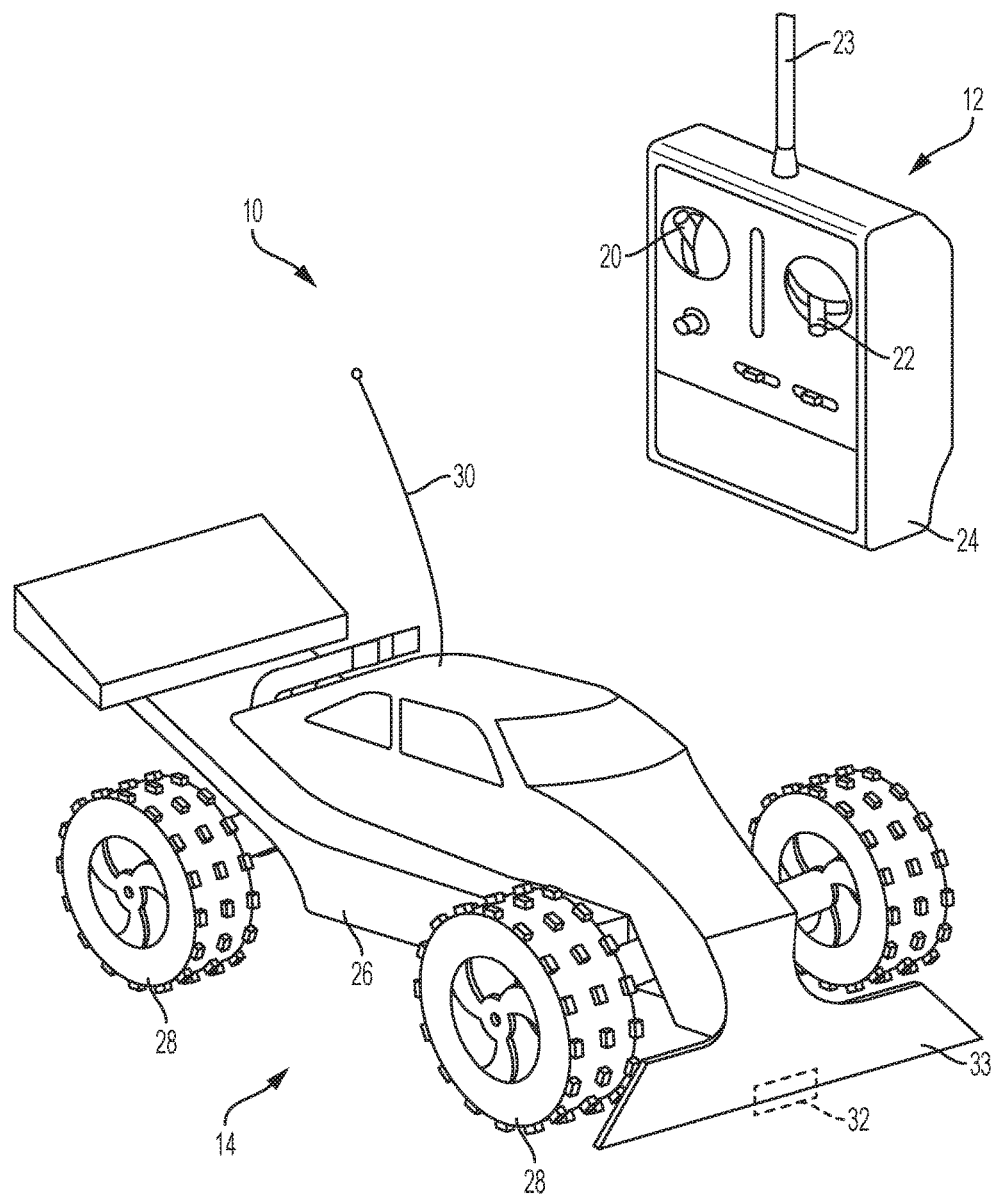
FIG. 1 is a perspective view of remote control system of the present invention, including a remote control unit and a toy device.

In FIG. 1, a remote control toy system 10 of the present invention is shown. Remote control toy system 10 includes a remote control 12 and a controlled toy 14.

Remote control 12 is operated by a user to control the toy 14. Remote control 12 is typically small enough to be held in one or both hands of the user and may include a variety of controls. For example, a joystick or lever 20 can be moved by the user up or down to command the toy 14 to move forward or back, respectively. In some rate control embodiments, the distance that the lever 20 is moved from an origin position (such as the center of the lever's range) controls the velocity of the controlled toy in the appropriate direction. Lever 22 can be moved left or right to command the toy to turn left or right, respectively. In some rate control embodiments, the distance that the lever 22 is moved from an origin position controls the amount or tightness of the turn of the toy. Other buttons, small steering wheels, knobs, dials, joysticks, trackballs, switches, direction pads, levers, or other controls can be included to command various other functions of the toy, such as to brake or stop the toy, power or start the toy, turn on headlights, change driving modes, sound a horn, etc. and/or to control steering and throttle functions instead of levers 20 and 22, and any of these controls can be provided with haptic feedback as described herein Some embodiments may provide the functionality of the remote control 12 in another device, such as a cell phone, portable computer (e.g. laptop or PDA), wristwatch, etc.

Remote control 12 may include a wireless transmission device for transmitting control signals through the air to the toy 14. The implementation of such a transmission device is well known to those of skill in the art. Often, remote control 12 includes an antenna 23 to broadcast radio frequency (RF) (or other frequency range) control signals at a desired frequency. In other embodiments, the control signals from the remote control can be sent along a wire or other transmission line that physically couples the remote control 12 to the toy 14. Some embodiments may allow the remote control 12 to receive signals from the toy 14, as detailed below; in such embodiments, appropriate receiver electronics are included in the remote control 12.

In the present invention, remote control 12 includes haptic feedback functionality. This functionality can be provided using one or more actuators included within or coupled to the housing 24 of the remote control 12. Various embodiments of the haptic remote control are described in detail below.

Toy 14 is shown in FIG. 1 as a remote controlled race car. Toy 14 can include chassis 26, wheels 28, and antenna 30. Chassis 26 includes one or more motors (not shown) for causing the toy to move, causing the wheels to turn, etc. In some embodiments, batteries are stored in the chassis 26 to provide power to the motors; other embodiments may provide other power sources, such as liquid fuel (e.g., gasoline). Antenna 30 allows the toy 26 to receive the command signals sent wirelessly by the remote control 12.

Toy 14 includes receiver electronics for receiving the commands from the remote control 12, e.g. at the proper broadcast frequency. In those embodiments in which information is transmitted to the remote control 12 from the toy 14, the toy 14 includes a transmitter, e.g. a wireless transmitter similar to the transmitter used by the remote control 12. Other components of the toy can include a microprocessor or other controller for implementing received commands, controlling the motors, reading sensors (for those embodiments including sensors), etc.

Other types of moving toy vehicles and devices can be similarly controlled, such as flying toy vehicles (e.g., planes, helicopters, rockets), water toy vehicles (e.g., boats and submarines), trucks, robots, toy animals, etc.

Local Haptic Sensation Embodiments

Figure 2:
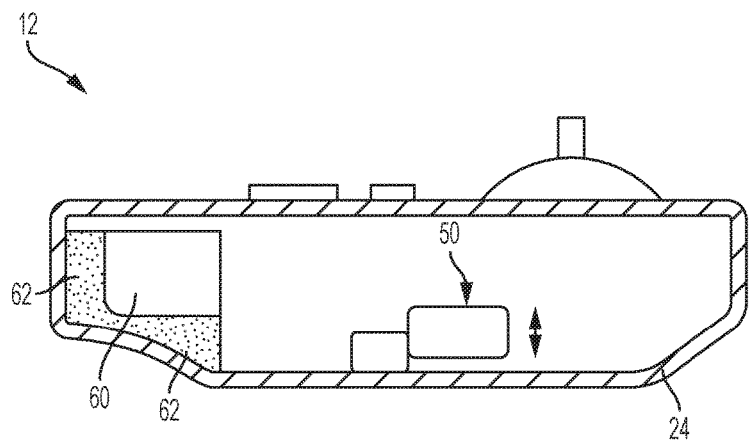
FIG. 2 is a side elevational cross-sectional view of the remote control unit of FIG. 1.

FIG. 2 is a side elevational view of a first embodiment of a remote control 12 of the present invention. In this embodiment, tactile feedback is provided to the user based on local actions taken by the user with the controls of the remote control 12.

The housing 24 of the remote control 12 includes an actuator assembly 50 which outputs forces on the housing 24 of the remote control 12. In the described embodiment, actuator assembly 50 oscillates an inertial mass in an approximately linear motion. The oscillations provided by the movement of the inertial mass are transmitted to the housing 24, where the user contacting the housing feels them as tactile sensations. The inertial mass can preferably be oscillated at different frequencies and force magnitudes to provide a variety of tactile sensations, such as pulses and vibrations.

One embodiment of an actuator assembly 50 is described below with reference to FIG. 3, where the actuator itself is oscillated as an inertial mass. In other embodiments, other types of actuator assemblies can be used. For example, an eccentric mass can be coupled to an actuator shaft and rotated, as described below with reference to FIG. 4. Other embodiments can employ a linear voice coil actuator or moving magnet actuator to move a coil or a magnet, respectively, and produce inertial pulses or vibrations. Some inertial feedback embodiments are described in copending application 09/456,887, which is incorporated herein by reference in its entirety. In still other embodiments, the actuator can drive a member to impact the housing and cause tactile feedback from one or more such impacts.

Other embodiments of the present invention can cause tactile feedback to a portion of the housing 24. For example, a portion of the housing can be made moveable with respect to the remaining portion of the housing. The moveable portion can be coupled to the actuator assembly and moved to provide tactile sensations. The moveable portion can be positioned at a location on the housing that is contacted by the user when holding, contacting or supporting the remote control 12 during normal use. In one embodiment, the moveable portion can be moved away from (e.g. perpendicular to) the outer surface of the stationary portion of the housing, such as a cover on a hinge, to move against the user's finger or palm. In other embodiments, the moveable portion can be moved laterally, parallel to the outer surface of the housing and in shear with the user's skin contacting the moveable portion (or both lateral and perpendicular motion can be provided). Some embodiments of a moveable surface portion are described in U.S. Pat. No. 6,184,868, which is incorporated herein by reference in its entirety.

A battery 60 or other power storage element can be included in the remote control 12 to supply power to the actuator assembly 50 and other components, such as a local microprocessor, transmitter, lights on the device, etc. Battery 60 can be the disposable form of battery, or a rechargeable battery which the user can remove, recharge, and replace. Some embodiments can provide a convenient compartment door in the housing 24 to allow easy access to the battery 60 by the user. One or more batteries 60 can be provided in the remote control 12 for the desired amount of power. Other types of power storage elements that supply power may be used in other embodiments. In some embodiments, the battery 60 may be recharged without the user having to remove it from the device housing 24. For example, the housing 24 can include a "docking port" or electrical connector connected to a rechargeable battery 60 which allows the remote control 12 to be plugged into a mating connector on a recharging power source device that is, for example, connected to a standard AC power outlet.

Battery 60 can be a heavy component and thus may be disadvantageous in an inertial haptic feedback device. The heaviness of the battery 60 can add to the overall mass of the device, which may weaken the strength of the inertial haptic sensations output by actuator assembly 50 and felt by the user. To compensate for this effect, a flexible or compliant coupling between the battery 60 and the housing 24 may be used; other embodiments may use a rubber or other compliant layer or spring element. Layer 62 allows the battery 60 to move at least partially independently of the housing 2, and thus inertially decouples the battery 60 from the housing 24. The layer 62 reduces the intertial contribution of the battery 60 to the system and allows the user to feel stronger tactile sensations within the given actuator assembly 50 than if the battery 60 were rigidly coupled to the housing without layer 62. These embodiments are described in greater detail in copending patent application 09/771,116, filed Jan. 26, 2001, and incorporated herein by reference in its entirety.

Figure 3:
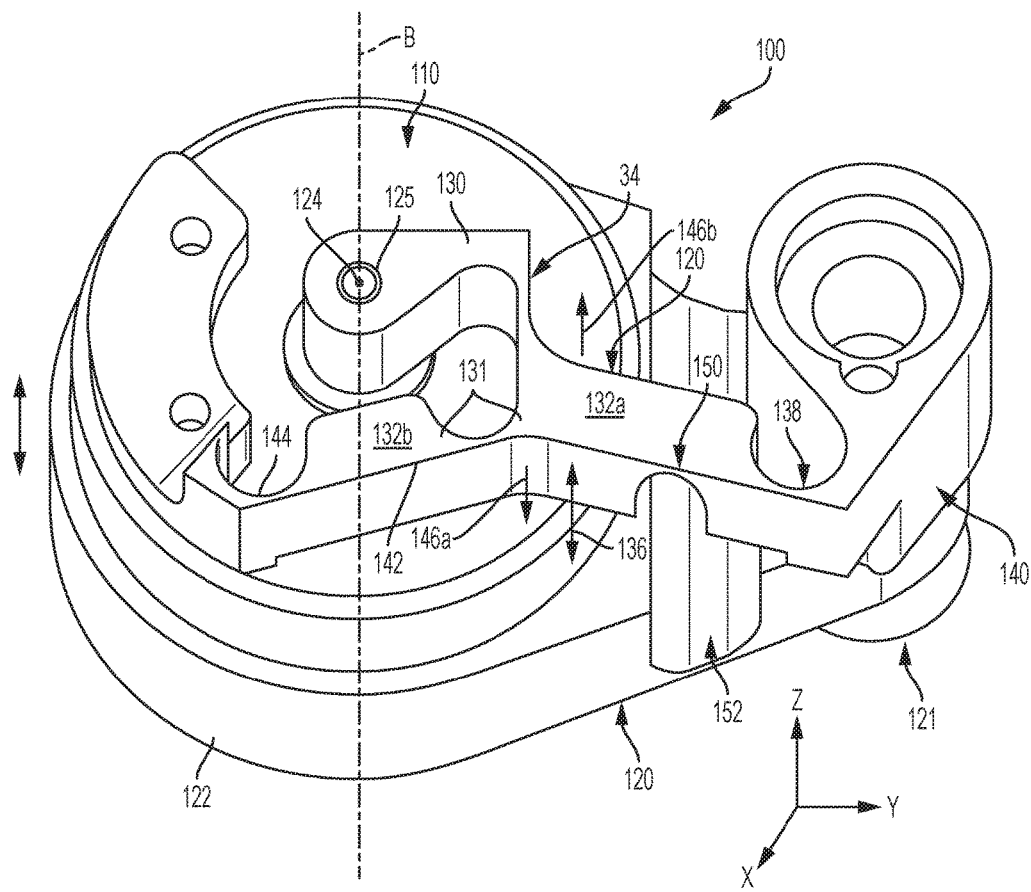
FIG. 3 is a perspective view of one embodiment of an actuator assembly suitable for use in the remote control unit of the present invention.

FIG. 3 is a perspective view of one embodiment 100 of the actuator assembly 50 for use in the remote control 12. Actuator assembly 100 includes a grounded flexure 120 and an actuator "0 coupled to the flexure 120. The flexure 120 can be a single, unitary piece made of a material such as polypropylene plastic ("living hinge" material) or other flexible material. Flexure 120 can be grounded to the housing 24 of the remote control 12, for example, at portion 121.

Actuator 110 is shown coupled to the flexure 120. The housing of the actuator is coupled to a receptacle portion 122 of the flexure 120 which houses the actuator 110 as shown. A rotating shaft 124 of the actuator is coupled to the flexure 120 in a bore 125 of the flexure 120 and is rigidly coupled to a central rotating member 130. The rotating shaft 124 of the actuator is rotated about an axis B which also rotates member 130 about axis B. Rotating member 130 is coupled to a first portion 132a of an angled member 131 by a flex joint 134. The flex joint 134 preferably is made very thin in the dimension it is to flex so that the flex joint 134 will bend when the rotating portion 130 moves the first portion 132a approximately linearly. The first portion 132a is coupled to the grounded portion 140 of the flexure by a flex joint 138 and the first portion 132a is coupled to a second portion 132b of the angled member by flex joint 142. The second portion 132b, in turn, is coupled at its other end to the receptacle portion 122 of the flexure by a flex joint 144.

The angled member 131 that includes first portion 132a and second portion 132b moves linearly along the x-axis as shown by arrow 136. In actuality, the portions 132a and 132b move only approximately linearly. When the flexure is in its origin position (rest position), the portions 132a and 132b are preferably angled as shown with respect to their lengthwise axes. This allows the rotating member 130 to push or pull the angled member 131 along either direction as shown by arrow 136.

The actuator 110 is operated in only a fraction of its rotational range when driving the rotating member 130 in two directions, allowing high bandwidth operation and high frequencies of pulses or vibrations to be output. To channel the compression or stretching of the flexure into the desired z-axis motion, a flex joint 152 is provided in the flexure portion between the receptacle portion 122 and the grounded portion 140. The flex joint 152 allows the receptacle portion 122 (as well as the actuator 110, rotating member 130, and second portion 132b) to move (approximately) linearly in the z-axis in response to motion of the portions 132a and 132b. A flex joint 150 is provided in the first portion 132a of the angled member 131 to allow the flexing about flex joint 152 in the z-direction to more easily occur.

By quickly changing the rotation direction of the actuator shaft 124, the actuator/receptacle can be made to oscillate along the z-axis and create a vibration on the housing 24 with the actuator 110 acting as an inertial mass. Preferably, enough space is provided above and below the actuator to allow its range of motion without impacting any surfaces or portions of the housing 24. In addition, the flex joints included in flexure 120, such as flex joint 152, act as spring members to provide a restoring force toward the origin position (rest position) of the actuator 110 and receptacle portion 132. In some embodiments, the stops can be included in the flexure 120 to limit the motion of the receptacle portion 122 and actuator 110 along the z-axis.

Figure 4:
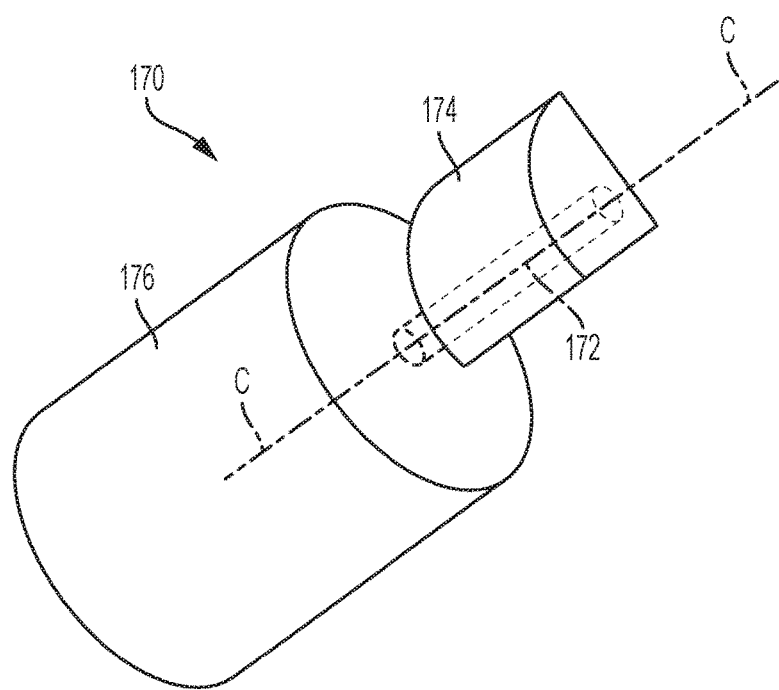
FIG. 4 is a perspective view of another embodiment of an actuator assembly suitable for use in the remote control unit of the present invention.

FIG. 4 is a perspective view of another embodiment 170 of an actuator assembly 50 suitable for use in the remote control 12 to provide tactile sensations to the user. Actuator assembly 170 includes an actuator 176, such as a DC motor, which includes a shaft 172 that rotates about an axis C, and an eccentric mass 174 that is rigidly coupled to the shaft 172 and thus rotates with the shaft about axis C. In one embodiment, the housing of the actuator 176 is coupled to the housing of the remote control 12, e.g. the actuator can be attached to the inside of the housing of the remote control. In other embodiments, the actuator can be coupled to a movable manipulandum, such as a joystick or mouse, or other member.

Many different types and shapes of eccentric masses 174 can be used. A wedge- or pie-shaped eccentric can be used, as shown, where one end of the eccentric is coupled to the shaft 172 so that most of the wedge extends to one side of the shaft. Alternatively, a cylindrical or other-shaped mass can be coupled to the shaft 172. The center of the mass 174 is positioned to be offset from the axis of rotation C of the shaft 172, creating an eccentricity parameter that is determined by the distance between the axis of rotation of the shaft 172 and the center of mass of the mass 174. The eccentricity can be adjusted in different device embodiments to provide stronger or weaker vibrations, as desired. Greater magnitude is generally obtained by changing the eccentricity if the motor is driven constantly in one direction.

When the eccentric mass 174 is rotated by the motor 170, a vibration is induced in the motor and in any member coupled to the motor due to the off-balance motion of the mass. Since the housing of motor 176 is preferably coupled to a housing of the remote control 12, the vibration is transmitted to the user that is holding the housing. One or more of motors 176 can be included in a control 14 to provide vibrotactile or other haptic feedback; for example, two motors may be used to provide stronger magnitude vibrations and/or vibrations in two different directions.

Other types of actuator assemblies may also be used, as disclosed in U.S. Pat. No. 6,184,868, such as a linear voice coil actuator, solenoid, moving magnet actuator, etc.

Haptic Sensations

Different types of haptic sensations can be output to the user in the local haptic sensation embodiment. Since the haptic sensations are determined based only on the local actions of the user on the remote control 12, the sensations can be based on specific actions or controls manipulated by the user.

Engine vibration: The actuator assembly 50 can be controlled to output haptic sensations that are meant to simulate the vibration of an engine in a vehicle. This vibration sensation can have a magnitude and/or frequency correlated to the position of a throttle control, such as lever 20 in FIG. 1, which controls the speed of the toy 14. For example, as the forward speed of the toy is increased, the magnitude and frequency of the imparted vibration sensation is increased. At high speeds of the toy, a high magnitude and high frequency vibration can be imparted to the user, while at low speeds, a soft "idling" sensation can be imparted. When the user moves the lever 20 to command the toy to move in reverse, a unique haptic sensation associated with the reverse direction can be output, e.g. a lower frequency vibration.

Turning: Haptic sensations can be controlled to be correlated with the user manipulating controls to turn the toy 14. For example, left-right lever 22 can be used to turn the toy left or right. In some embodiments, the amount of movement of the lever from the origin position controls the tightness of the turn; when the lever is fully left or right, the toy turns in its smallest turning radius. Vibrations can be output on the remote control 12 to indicate the tightness of the turn. For example, a wide turn can be associated with a lower-frequency vibration, while a tight turn can be associated with a higher-frequency vibration. In some embodiments, both the speed and turn controls can be used in the determination of a haptic sensation. For example, a fast, tight turn can cause sporadic pulses as haptic sensations, which simulate the feel of tires of the toy losing traction with the ground.

Other sensations: Other controls on the remote control 12 can be associated with haptic sensations. If there is a braking control that commands the toy to apply brakes or slow down its motion, a vibration can be output during the braking. Horns, blinking lights, or other functions of the toy controlled from the remote control 12 can also be associated with different haptic sensations.

Kinesthetic force feedback can also be output on the controls of the remote control, which is forces in one or more of the sensed degrees of freedom of a manipulandum. For example, a motor or other actuator can output forces in the degree of freedom of lever 20 and 22, in the degree of freedom of motion of a button or switch, in the rotary degree of freedom of a small steering wheel or knob, etc. Some embodiments for providing such haptic feedback are described below with respect to FIG. 6.

In a kinesthetic force feedback embodiment, time-based haptic effects can be output in the degree of freedom of a control, similar to the tactile effects described above. For example, a vibration or jolt can be directly output on the lever 20 or 22 while the user is holding it when controlling the toy 14 in a desired manner. The magnitude and/or frequency of the jolt or vibration can be based on the position of the control in its degree of freedom, and/or can simulate engine rumble, turning radius, etc.

Furthermore, more sophisticated haptic sensations can be output in the kinesthetic force feedback embodiment. For example, a spring sensation generated by an actuator can provide a restoring force to a lever to its origin position. A tight or high-magnitude spring can be output for a fast turn of the toy 14, while a loose, low-magnitude spring can be output for a slow turn to simulate driving conditions at those speeds. Detents in the lever (or other control) motion can be output to mark particular positions to the user, e.g. each ¼ of the lever range moved provides a detent to let the user haptically know how fast he or she is controlling the car to move or how tight a turn is being controlled. The detents can be implemented as jolts, spring forces, or other force profiles. A damping force can resist lever motion based on the velocity of lever motion. A barrier or obstruction force can prevent or resist motion of a control past a desired limit.

Haptic Feedback Based on Information from the Controlled Toy

More sophisticated embodiments of the present invention are described below. In these embodiments, the toy 14 can send signals to the remote control 12 to inform the remote control of one or more statuses or conditions of the toy. The output of haptic sensations, and the characteristics of those haptic sensations (e.g., type of sensation, magnitude, frequency, duration, etc.), can be based solely or partially on these signals.

In one embodiment, one or more sensors are mounted on the toy 14. For example, referring to FIG. 1, a sensor 32 can be mounted to the front bumper 33 of the car 14. When the car impacts or collides with an obstacle that is in the sensing range of the sensor 32, the sensor 32 detects the collision and immediately relays status signals to the remote control 12 that the collision has occurred. In some embodiments, the sensor 32 can be an on/off sensor, detecting only whether a collision has occurred or not. In other embodiments, more sophisticated sensors can be used, such as analog sensors, which detect the strength of the collisions.

The sensor 32 can be any of a variety of different types of sensors. For example, an optical sensor with emitter and detector, a magnetic sensor, a mechanical contact sensor, analog potentiometers that measure the motion of a contact member, or other types of sensors for detecting contact can be used. Alternatively, or additionally, one or more sensors can be positioned at other areas of the toy to detect contact in those areas, such as at a rear bumper or other rear surface, a side surface, the underside of the toy, etc.

The signals sent from the toy 14 to the remote control 12 can have the same broadcast carrier frequency as the signals transmitted from remote control to toy, or can have a different frequency. The remote control 12, upon receiving the signal from the toy, can command a tactile sensation appropriate to the signal.

A variety of haptic sensations can be provided. If a collision is detected by the sensor 32, the controller (see FIG. 7) can command a jolt, pulse, or vibration to the housing of the remote control. The user thus feels haptic feedback correlated to what the toy is experiencing. This can be not only more entertaining for the user, but also useful in a variety of contexts. For example, if the toy moves out of the sight of the user and collides with a wall, the user can be informed haptically and will know that the toy must be controlled in reverse to back away from the wall. If multiple sensors at different locations of the toy are being used, then a front collision can be associated with a different haptic sensation than a rear collision of the toy, a left side collision can be associated with a different haptic sensation than a right side collision, etc. For example, a front collision can be associated with a jolt or vibration having a high frequency and/or magnitude, while a rear collision can be associated with a jolt or vibration having a lower frequency and/or magnitude. If the remote control 12 includes multiple actuator assemblies 50, then the assemblies can be positioned in the remote control housing to correlate with locations on the toy. For example, one assembly can be positioned on the left side of the remote control, and the other assembly positioned on the right side. When the toy impacts something on its right side, the right actuator assembly can be controlled to output a jolt or vibration, so that the user feels a haptic sensation on the right side of the controller. Similar directional tactile feedback is described in copending application no. 60/242,918, filed Oct. 23, 2000 which is incorporated herein by reference in its entirety.

In addition, the magnitude of the haptic sensations can be correlated with a speed of the toy that is assumed from the throttle control on the remote control 12. For example, if the lever 20 has been pushed forward to its full extent, then it is assumed the toy is moving very fast and that when a collision occurs, it is a strong one. Thus, a high-magnitude jolt or vibration is output. If, on the other hand, the lever 20 is positioned only slightly away from its origin position when a collision is sensed by the sensor 32, a slow toy speed is assumed and a lower-magnitude sensation can be output on the remote control 12.

In embodiments providing an analog sensor, force sensor, or variable-state sensor as sensor 32, different haptic sensations can be more realistically associated with different degrees of collision or contact as sensed by the sensors. For example, the sensor 32 can directly sense whether a collision is a strong one, and the magnitude of the correlated haptic sensation can be proportionally adjusted. Thus, a mid-strength collision can be associated with a haptic sensation having a magnitude in the middle of the available output range. This can provide a more realistic correlation between collision strength and haptic sensation strength, since a speed of the toy is not assumed, and an actual collision strength is measured.

Haptic sensations can also be based on a combination of toy status, as relayed by the sensor(s) 32, and user manipulation of a manipulandum or control on the remote control 12. For example, a centering spring force output in the degree of freedom of a steering wheel or knob on remote control 12 can be based on the current position of that wheel or knob, and can be combined with a jolt force that is output based on a sensed collision of the toy with another object.

Figure 5:
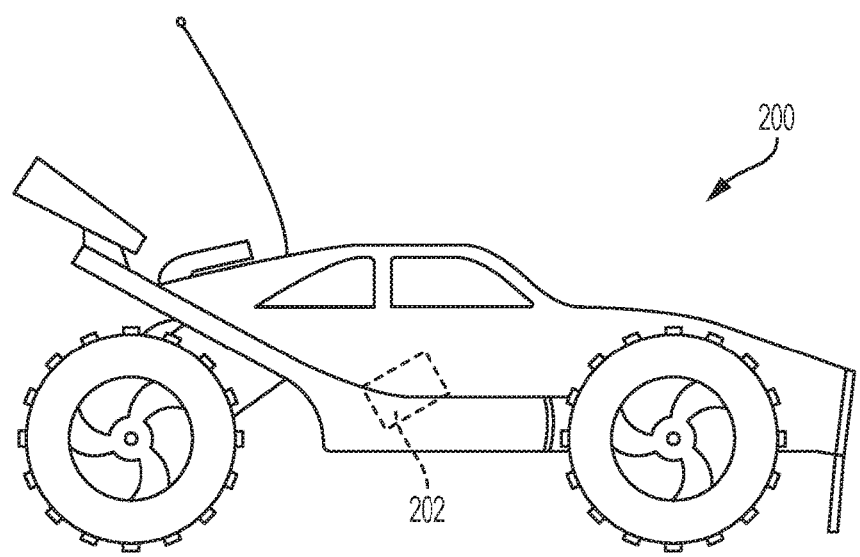
FIG. 5 is a side elevational view of the toy device of the present invention that includes an accelerometer for determining accelerations on the toy.

FIG. 5 is a side elevational view of a toy vehicle 200 similar to the toy 14 of FIG. 1, but has been modified to provide signals to the remote control 12. Toy 200 includes an inertial sensor 202 (e.g., an accelerometer) which can sense the accelerations to which the toy 200 is subject.

Such inertial sensors can take a variety of different embodiments. For example, Inertial sensor 202 can be a lower-cost single-axis accelerometer that can measure accelerations in only one axis. This type of sensor can be placed to sense only front-back, top-bottom, or side-to-side accelerations, if desired. Alternatively, this type of accelerometer can be positioned in toy 200 at an angle, as shown in FIG. 5, so it can sense both vertical (top-bottom) and front-back accelerations. For example, placing the accelerometer at a 45-degree angle allows sensing in both these dimensions/axes (where a controller such as a local microprocessor can interpret the signals from the accelerometer to determine which accelerations are occurring in which dimensions). The sensor can be positioned at other angles to measure accelerations in other dimensions. In higher-cost embodiments, multi-axis accelerometers can be used to provide separate signals for each sensed dimension.

Use of the accelerometer allows the user to feel haptic sensations that can be correlated with a variety of interactions that the toy is experiencing. For example, the accelerometer can sense and send status signals and data to the remote control representative of accelerations on the toy indicating the toy is bouncing over rough terrain or down stairs, landing after jumping off a ramp, or sideswiping another toy or object. Different haptic sensations can be output on the remote control 12 which simulate or indicate all of these conditions on the toy.

The accelerometer can also be used in conjunction with multiple actuator assemblies 50 placed at different locations on the remote control 12, as described above. For example, sensed accelerations of the car in a front-back axis can cause actuator assemblies positioned at the front and back of the remote control 12 to output haptic sensations in correlation with the sensed accelerations. Left/right actuator assemblies can similarly provide left/right differentiation to the user.

Figure 6:
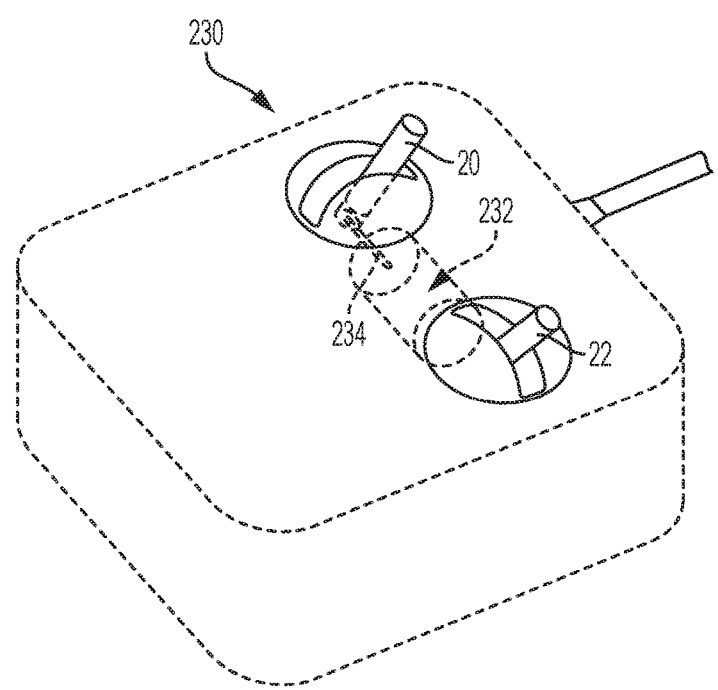
FIG. 6 is a perspective view of one embodiment of a lever on the remote control provided with kinesthetic force feedback by a motor.

FIG. 6 is a perspective view of one example embodiment 230 for a kinesthetic force feedback implementation of the remote control 12. Up/down lever 20 is shown coupled by a shaft 234 to a rotary actuator 232, which can be a DC motor, for example, or other type of actuator. The actuator 232 can output forces in the rotary degree of freedom of the lever 20 as controlled by actuator signals from a local controller such as a microprocessor. In addition, a sensor can be coupled to the same shaft 234 to determine the position of the lever 20 in its degree of freedom. A similar actuator can be coupled to lever 22 to drive that lever in its left-right degree of freedom.

Other embodiments can employ different types of actuators, such as voice coil actuators, moving magnet actuators, brushed or brushless motors, etc. Also, some embodiments can provide passive actuators that output a resistance on the lever, but cannot output an active force on the lever; such actuators include magnetic particle brakes, fluid brakes, or other brake-like devices.

Other controls on the remote control 230 can be similarly provided with kinesthetic force feedback. Buttons, for example, can be coupled to actuators to output forces in the degree of freedom of the button, as disclosed in U.S. Pat. No. 6,184,868. Knobs, dials, linear sliders or switches, steering wheels, trackballs, direction pads, joysticks and other controls can also be actuated.

Kinesthetic force feedback on the controls of the remote control can offer greater realism to experienced haptic effects. For example, spring forces can be output on the levers 20 and 22 to provide a centering function without having to use mechanical springs. Furthermore, when the toy is moving faster, the spring magnitude can be controlled to be higher to simulate the increased road forces on the steering of the car. In addition, if a local sensor such as an accelerometer detects that the car is airborne, the spring magnitude can be made zero to simulate the feel of light steering when the car loses contact with the road. When the car is experiencing a bumpy or rough terrain, the accelerometers on the car can provide the data back to the remote control to cause vibration or other forces on the lever that simulates the bumpiness and may cause some difficulty to the user in steering the toy.

Figure 7:
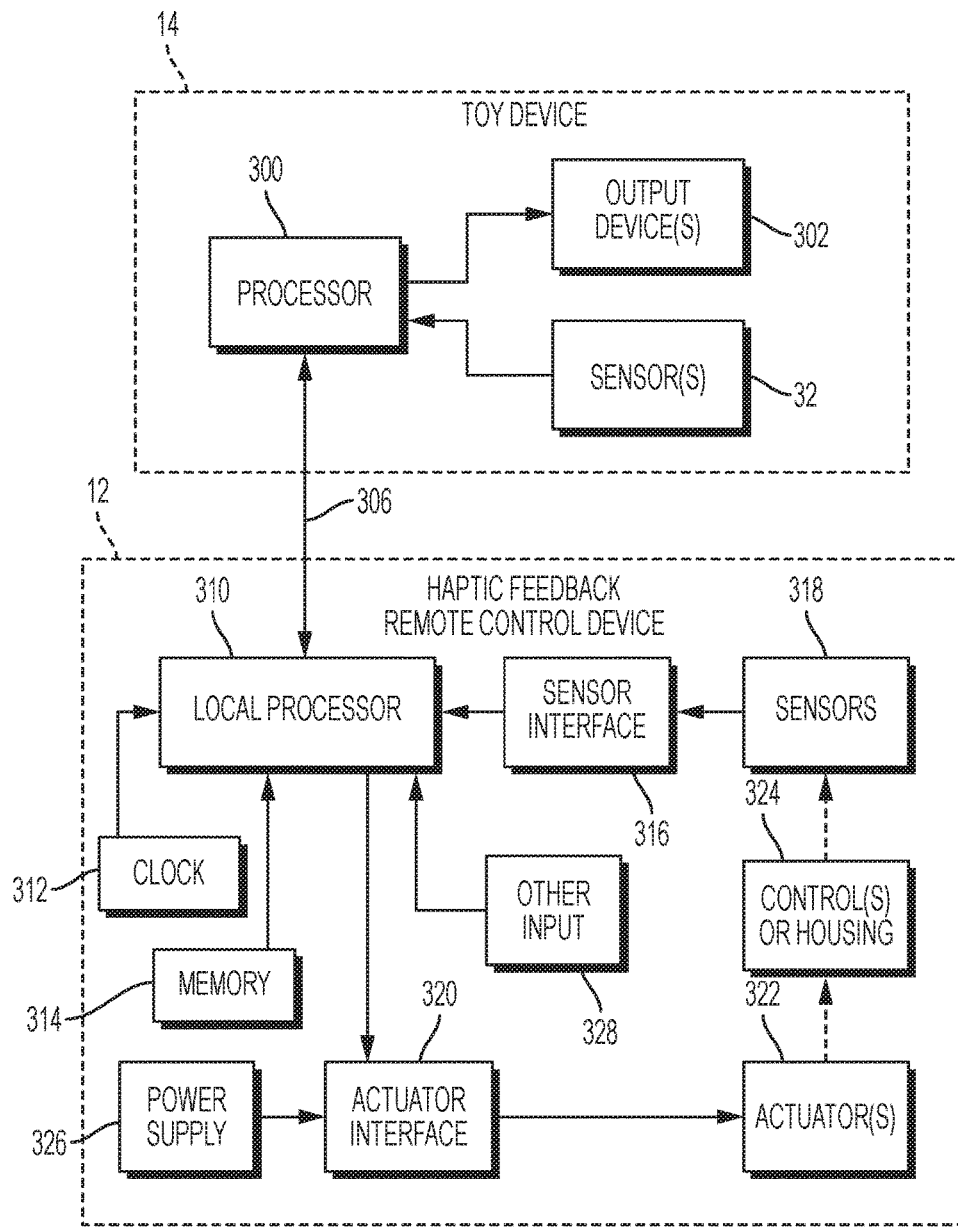
FIG. 7 is a block diagram illustrating the components of the remote control unit and the toy device of the present invention.

FIG. 7 is a block diagram illustrating a haptic feedback remote control device 12 and toy device 14 of the present invention. Remote control 12 and toy 14 can be any of the described embodiments herein.

As explained above, toy device 14 can include electronic components for receiving signals and controlling motion of the toy. In some embodiments, the toy device 14 may include a processor 300, such as a microprocessor or other controller (hardware state machines, digital logic, an ASIC, etc.), which can receive sensor signals from sensor 32 (if a sensor is included on the toy) and which can output signals to control any output devices 302, such as motors that turn the front wheels for steering, wheel motors or other motors providing locomotion of the toy, any audio output devices such as a horn, and any visual output devices such as lights. In other embodiments, circuitry other than a processor 300 can be used for providing signals to output devices 302 and receiving signals from sensors 32 can be provided; for example, an analog control system can receive the signals from the remote control to drive the appropriate motors of the toy 14. An ASIC, state machines, or other logic can also be used. Any other required components for use with processor 300 may also be included, such as memory, I/O circuitry, etc.

Processor 300 of the toy device 14 has a communication link 306 with the remote control device 12, as explained above. This link can be wireless through the use of RF or signals of other frequencies, or through a wire or other physical connection. In some embodiments, the link in one way, from the remote control device 12 to the toy 14. In other embodiments, the link is bi-directional.

The haptic feedback remote control device 12 may include a local processor 310 which handles the input, output, and control functions of the remote control. The local processor 310 can be provided with software (firmware) instructions to monitor the controls of the remote control device 12, wait for information sent from the toy device 14, and provide signals to the actuators of the remote control device to control haptic sensations. Processor 330 can include one microprocessor chip, or multiple processors and/or co-processor chips. In other embodiments, microprocessor 330 can include digital signal processor (DSP) functionality, or be implemented as control logic components, and ASIC, or hardware state machine instead of an actual microprocessor chip.

A local clock 312 can be coupled to the processor 330 to provide timing data which might be required, for example, to compute forces output by actuators of the remote control 12. Local memory 314, such as RAM and/or ROM, can be coupled to processor 310 to store instructions for processor 310 and store temporary and other data.

Sensor interface 316 may optionally be included in device 12 to convert sensor signals to signals that can be interpreted by the processor 310. For example, sensor interface 316 can receive and convert signals from a digital sensor such as an encoder or from an analog sensor using an analog to digital converter (ADC). Such circuits, or equivalent circuits, are well known to those skilled in the art. Alternately, processor 310 can perform these interface functions. Sensors 318 sense the position, motion, and/or other characteristics of particular controls of remote control device 12; for example, sensors 318 can sense the motion or position of levers 20 and 22 and any other buttons, switches, joysticks, trackballs, etc. on the remote control 12. Sensors 318 provide signals to processor 310 including information representative of that motion or position. Example of sensors suitable for embodiments described herein are analog potentiometers, Hall effect sensors, digital rotary optical encoders, linear optical encoders, optical sensors such as a lateral effect photo diode, velocity sensors (e.g., tachometers) and/or acceleration sensors (e.g., accelerometers). Furthermore, either relative or absolute sensors can be employed.

Actuator interface 320 can be optionally connected between the actuators of remote control device 12 and processor 310 to convert signals from microprocessor 310 into signals appropriate to drive the actuators. Interface 320 can include power amplifiers, switches, digital to analog controllers (DACs), and other components well known to those skilled in the art.

Actuators 322 transmit forces, as described above, to the housing of the remote control 12 and/or particular controls 324 of remote control device 12 in one or more directions along one or more degrees of freedom in response to signals output by processor 310, i.e., they are "computer controlled." Actuators 322 can include the actuator assembly 50 or rotary actuator 234 described above. The actuators can a variety of devices, such as linear current control motors, stepper motors, pneumatic/hydraulic active actuators, a torquer (motor with limited angular range), magnetic particle brakes, friction brakes, or pneumatic/hydraulic passive actuators.

Power supply 326 can be coupled to actuator interface 320 and/or to actuators 322 to provide electrical power to the actuator and other components of the remote control 12. As described above, power supply 326 is preferably batteries or other portable power supply.

Other input devices 328 can be included in device 12 and send input signals to microprocessor 310. Such input devices can include other buttons, dials, knobs, switches, voice recognition hardware, or other input mechanisms as described above. A safety or "deadman" switch can be included in some embodiments to provide a mechanism to allow a user to override and deactivate forces output by actuators 322.

The operation of the system is now generally described. In the simpler, lower-cost embodiment, the sensors 318 can detect motion of controls such as levers 20 and 22 by the user and send the appropriate signals to the processor 310. The processor 310 then sends the appropriate control signals to the toy device 14 to control it in accordance with the user manipulation of the controls. The processor 310 also sends actuator signals to the actuator assembly(ies) 50 to output haptic sensations in accordance with the control manipulated and the way that control is manipulated. In the more sophisticated embodiments, the toy device 14 can send signals to the remote control 12. In those embodiments, the local processor 310 receives signals from local sensors 318 as well as information from the sensors 32 on the toy device 14. The local processor then determines the haptic sensations to be output and controls the actuators 322 accordingly, as well as sending control signals to the toy device in accordance with the present user manipulation of the remote control 12.

While this invention has been described in terms of several preferred embodiments, it is contemplated that alterations, permutations, and equivalents thereof will become apparent to those skilled in the art upon a reading of the specification and study of the drawings. Furthermore, certain terminology has been used for the purposes of descriptive clarity, and not to limit the present invention. It is therefore intended that the following appended claims include all such alterations, permutations and equivalents as fall within the true spirit and scope of the present invention.

What is claimed is:

1. A remote control comprising:
   a housing;
   a manipulandum configured to cause a control signal to be sent to a remotely-controlled device;
   a plurality of haptic actuators configured to output haptic sensations, wherein the plurality of haptic actuators are positioned on the housing of the remote control in a configuration that corresponds similarly to a physical positional relationship between a plurality of sensors positioned on the remotely-controlled device;
   a receiver configured to receive one or more sensor signals from the plurality of sensors positioned on the remotely-controlled device; and
   a processor in communication with the plurality of haptic actuators and the receiver, the processor configured to:
      receive a sensor signal from a sensor of the plurality of sensors positioned on the remotely-controlled device, the sensor signal being indicative of a contact between the remotely-controlled device and an external object;

generate an actuator signal based at least in part on the sensor signal received from the remotely-controlled device, the actuator signal being configured to cause a haptic actuator of the plurality of haptic actuators to output a haptic sensation; and transmit the actuator signal to the haptic actuator, wherein the haptic actuator is positioned in a first physical location on the housing of the remote control that corresponds similarly to a second physical location on the remotely-controlled device of the sensor that generated the sensor signal.

2. The remote control of claim 1, wherein the sensor signal from the sensor positioned on the remotely-controlled device is associated with a movement of the remotely-controlled device.

3. The remote control of claim 2, wherein the sensor positioned on the remotely-controlled device comprises a contact sensor.

4. The remote control of claim 2, wherein the sensor positioned on the remotely-controlled device comprises a pressure sensor.

5. The remote control of claim 2, wherein the sensor positioned on the remotely-controlled device comprises an accelerometer.

6. The remote control of claim 1, wherein the manipulandum comprises a throttle control.

7. The remote control of claim 1, wherein the manipulandum comprises a directional control.

8. The remote control of claim 1, wherein the remotely-controlled device comprises a remotely-controlled toy.

9. The remote control of claim 1, wherein the remotely-controlled device comprises a remotely-controlled car.

10. The remote control of claim 1, wherein the haptic actuator comprises an inertial mass actuator.

11. The remote control of claim 1, wherein the processor is further configured to generate the actuator signal based at least in part on a state of the remotely-controlled device and a state of the manipulandum.

12. The remote control of claim 1, wherein each haptic actuator in the plurality of haptic actuators is coupled to the housing of the remote control in a physical location that is similar to where a particular sensor in the plurality of sensors is physically positioned on the housing of the remotely-controlled device.

13. A system comprising:
a remotely-controlled device comprising:
  a first receiver configured to receive one or more control signals,
  a plurality of sensors configured to sense a contact between the remotely-controlled device and an external object, wherein the plurality of sensors are physically arranged around a perimeter of the remotely-controlled device, and
  a transmitter configured to transmit signals associated with sensor signals from the plurality of sensors; and
a remote control for remotely controlling the remotely-controlled device, the remote control comprising:
a housing;

a manipulandum configured to cause a control signal to be sent to the remotely-controlled device;
a plurality of haptic actuators configured to output haptic sensations, wherein the plurality of haptic actuators are positioned on the housing of the remote control in a configuration that corresponds similarly to a physical positional relationship between the plurality of sensors positioned on the remotely-controlled device;
a second receiver configured to receive one or more sensor signals from the plurality of sensors positioned on the remotely-controlled device; and
a processor in communication with the plurality of actuators and the second receiver, the processor configured to:
  receive a sensor signal from a sensor of the plurality of sensors positioned on the remotely-controlled device;
  generate an actuator signal based at least in part on the sensor signal received from the remotely-controlled device, the actuator signal being configured to cause a haptic actuator of the plurality of haptic actuators to output a haptic sensation; and
  transmit the actuator signal to the haptic actuator, wherein the haptic actuator is positioned in a first physical location on the housing of the remote control that corresponds similarly to a second physical location around the perimeter of the remotely-controlled device of the sensor that generated the sensor signal.

14. A system as received in claim 13, wherein the sensor signal from the sensor positioned on the remotely-controlled device is associated with a movement of the remotely-controlled device.

15. A system as recited in claim 13, wherein the sensor positioned on the remotely-controlled device comprises a contact sensor, a pressure sensor, or an accelerometer.

16. A system as recited in claim 13, wherein the manipulandum comprises a throttle control or a directional control.

17. A system as recited in claim 13, wherein the remotely-controlled device comprises a remotely-controlled toy or a remotely-controlled car.

18. A system as recited in claim 13, wherein the haptic actuator comprises an inertial mass actuator.

19. A system as recited in claim 13, wherein the processor is further configured to generate the actuator signal based at least in part on a state of the remotely-controlled device and a state of the manipulandum.

20. The remote control of claim 1, wherein the processor is further configured to:
select the haptic actuator from among the plurality of haptic actuators based on the first physical location of the haptic actuator on the housing of the remote control corresponding to the second physical location of the sensor on the remotely-controlled device.

* * * * *